United States Patent [19]

Walker et al.

[11] Patent Number: 4,526,847

[45] Date of Patent: Jul. 2, 1985

[54] IMAGE RECEIVING TRANSPARENCY AND METHOD OF MAKING

[75] Inventors: Stephen L. Walker, Hoffman Estates; Beatrice E. Thorpe, Arlington Heights, both of Ill.

[73] Assignee: Weber Marking Systems, Inc., Arlington Heights, Ill.

[21] Appl. No.: 485,207

[22] Filed: Apr. 15, 1983

[51] Int. Cl.[3] .......................... G03G 7/00; B32B 27/10

[52] U.S. Cl. .......................................... 430/18; 430/17; 430/11; 428/481

[58] Field of Search ........................ 430/17, 66, 31, 11, 430/18; 428/480, 481

[56] References Cited

U.S. PATENT DOCUMENTS

| | | | |
|---|---|---|---|
| 1,908,341 | 5/1933 | Gentile | 428/535 |
| 2,824,019 | 2/1958 | Sapper | 428/481 |
| 3,498,786 | 3/1970 | Notley et al. . | |
| 3,561,337 | 2/1971 | Mulkey . | |
| 3,854,942 | 12/1974 | Akman . | |
| 3,857,729 | 12/1974 | Burwasser . | |
| 3,949,148 | 4/1976 | Akman . | |
| 4,109,937 | 8/1978 | Gager . | |
| 4,114,926 | 9/1978 | Habib et al. . | |
| 4,245,025 | 1/1981 | Kato et al. | 430/126 |
| 4,259,422 | 3/1981 | Davidson et al. . | |
| 4,366,239 | 12/1982 | Shinagawa et al. | 430/534 X |

FOREIGN PATENT DOCUMENTS

| | | |
|---|---|---|
| 49-21606 | 3/1974 | Japan . |

*Primary Examiner*—Roland E. Martin
*Attorney, Agent, or Firm*—Gerlach & O'Brien

[57] ABSTRACT

A transparency for the formation of an adherent electrostatic image thereon includes a polyester resin film sheet having an image-receiving coating of nitrocellulose, a plasticizer, a particulate material, and, preferably, an antistatic agent. The coating is applied to the film sheet from a solvent mixture of an aliphatic ester or an aliphatic ketone, and an aliphatic alcohol.

9 Claims, No Drawings

IMAGE RECEIVING TRANSPARENCY AND METHOD OF MAKING

BACKGROUND OF THE INVENTION

This invention relates to a transparency and to a method of making the transparency, particularly, a transparency for the formation of an adherent electrostatic image thereon. More particularly, the invention relates to a clear film projection transparency used in a xerographic or electrostatographic reproduction process for formation thereon of an image especially suited for projecting onto a screen or other surface for viewing purposes.

Clear film projection transparencies in current use include two popular types: xerographic or plain paper copier transparencies, and thermal (infrared) transparencies. The xerographic transparencies are loaded into a plain paper copier (dry paper copier) in the same manner as plain paper used for making copies of an original. The xerographic transparencies accept a xerographic image of the original in the same manner as does paper. As is well known in the art, the image is formed by transferring a toner to a surface of the transparency, and the toner is fused into the surface, to provide a permanent copy. The thermal transparencies are imaged by exposure to infrared radiation in the presence of an original, with the image being formed chemically. Xerographic transparencies typically are made from a thin film of an organic resin, such as a polyester resin film, constituting a base sheet, and a resin coating or film on a surface of the base sheet which is compatible with the xerographic toner and the base sheet, and serves to anchor the xerographic image and minimize static electricity. The patent literature discloses that the resins employed in coatings on the base sheet include vinyl, acrylic, styrene, and linear polyester resins, and hydrophilic colloids of hydrolyzed cellulose acetate and hydroxethyl cellulose, as disclosed, for example, in U.S. Pat. Nos. 3,854,942; 3,949,148; 4,085,245; 4,259,422; and 4,320,186. The patents also disclose various problems encountered in the manufacture of such transparencies, including the problems of achieving good adherence of the image-forming toner to the transparency, avoiding image distortion, and reducing static electricity, so as to permit automatically feeding a plurality of stacked transparency sheets to the copier without interference caused by electrostatic attraction of adjacent sheets to each other. The ideal xerographic transparency should be nearly static-free, highly transparent, and have a scratch-resistant coating, and when xerographically imaged, should have a well-adhered, faithful image, not subject to cracking, and having a high contrast ratio. In providing such a transparency, various other problems are to be avoided or minimized, including curling, sticking, fogginess, splotches, streakiness, waviness, rainbowing, and wrinkling.

SUMMARY OF THE INVENTION

In accordance with the invention, an excellent xerographic transparency is provided, employing a polyester resin film sheet as the base sheet, and an image-receiving coating thereon in which the film-former is nitrocellulose. The transparency achieves the above-described qualities of being nearly static-free, highly transparent or light-transmitting, and scratch-resistant, and a xerographic image adheres strongly thereto, without cracking or distortion, providing an accurate image having a high contrast ratio. The various other tendencies listed above are substantially avoided or minimized, so that they are not substantial factors in imaging and use of the transparency, particularly, use in overhead projection equipment for projecting images on a viewing screen.

More particularly, the invention provides a transparency for receiving adherently thereon a toner-developed latent electrostatic image, which includes a polyester resin film sheet and an image-receiving coating on at least one surface of the sheet and comprising nitrocellulose, a plasticizer, and a particulate material dispersed in the coating. Preferably, an antistatic agent also is included in the coating.

An imaged transparency provided in accordance with the invention includes the foregoing transparency, and a fused toner-developed electrostatic image on the coating. The imaged transparency is especially well suited for use as a projection transparency.

The invention also provides a method for making a transparency for receiving adherently thereon a toner-developed latent electrostatic image, which includes the steps of coating at least one surface of a polyester resin film sheet with a solution of nitrocellulose and a plasticizer in a solvent of an aliphatic ester or an aliphatic ketone, and an aliphatic alcohol, such solution having a particulate material dispersed therein, and removing solvent by evaporation, to provide an image-receiving coating on said surface.

DESCRIPTION OF THE PREFERRED EMBODIMENTS

The polyester resin film sheet employed in the invention preferably is a heat stable, highly polymeric, linear polyethylene terephthalate sheet which has been biaxially oriented and heat set to provide improved dimensional stability. It is further preferred that one or both surfaces of the polyester film sheet be treated for improved adherability of the image-receiving coating to such surface or surfaces. A useful technique involves scarifying the surface or surfaces with sodium hydroxide. Preferred commercially available polyester film sheets include XM 728 adherable Mylar (DuPont); Celanar 4500 series polyester film (Celanese); Hostaphan 4500 polyester film (Hoechst AG); and Melinex 054 polyester film (ICI Americas). The film thickness preferably is in the range of about 2 to 5 mils. The foregoing polyester resin film sheets have transparencies of about 88–89%.

Nitrocellulose is employed in the image-receiving coating as the film-former and binder, in a preferred proportion of about 60 to 75% by weight, dry or solvent-free basis. Either RS nitrocellulose (5–6 sec.) or SS nitrocellulose (5–6 sec.) preferably is employed, employing suitable proportions of solvents, as described hereinafter.

The plasticizer both contributes to adherence of the nitrocellulose film to the polyester film sheet, and imparts more flexibility to the nitrocellulose film. The preferred plasticizer is castor oil. Other plasticizers which may be employed include dibutyl phthalate, alkylaryl phosphate (Santicizer 141, Monsanto), polyethyleneglycol-2-ethyl hexoate (Flexol 4-GO, Union Carbide), tricresyl phosphate, sorbitan monooleate, dioctyl adipate (di-(2-ethyhexyl)adipate), and butyl acetyl ricinoleate. The plasticizers are employed in a proportion preferably in the range of about 15–35% by weight of the coating, on a dry basis.

The particulate material functions as a slip agent, to reduce friction between adjacent surfaces of stacked transparency sheets, thereby minimizing static build-up. The material is employed in a preferred particle size range of about 0.3 to 10 microns. A preferred particulate material is colloidal silica, in a preferred particle size range of about 3 to 9 microns. Other particulate materials which may be employed include magnesium silicate, aluminum silicate, sodium borosilicate, and titanium dioxide. The particulate materials are employed in a proportion preferably in the range of about 0.5–1.5% by weight of the coating, on a dry basis. The relatively low proportions cooperate in preserving adherence of the coating to the base sheet and minimizing reduction in light transmittance.

Inasmuch as static build-up from a minimal amount of friction cannot be completely eliminated, it is preferred to employ in the coating, in addition to a slip agent, an antistatic agent. These agents, preferably of the well known type employed in the textile industry, function to increase the conductivity of the coating surface, thereby to dissipate static charge. Preferred antistatic agents include fatty alcohol phosphates, such as "Zelec" NK and "Zelec" NE (DuPont), which are recommended by the manufacturer for use with plastic fibers and films, particularly "Mylar" polyester film. Other useful known antistatic agents include amines, such as Kemamine (Humko), amides, and ethosulfate, such as Atlas G263 (ICI Americas). The antistatic agents are employed in a proportion preferably in the range of about 1–7% by weight of the coating, on a dry basis.

To the foregoing functional ingredients may be added antioxidants, dyes, and other ingredients, to the extent that they do not detract materially from the above-described characteristics of the transparency of the invention. Conventional antioxidants preferably are included, as a precautionary measure to insure long shelf life. A preferred combination of butylated hydroxytoluene (BHT) and a dilauryl-thiodipropionate (DLTDP) is employed in the illustrative examples. Dyes may be included in the coating composition, for reducing glare, aesthetic purposes, masking otherwise insignificant off-color or color effects, color coding, or other purpose.

The coating is deposited on the polyester resin film sheet from a solution/dispersion of the foregoing materials in an organic solvent. Thus, the particulate material is dispersed in or mixed with a solvent solution of the remaining materials. In order to provide the desired adherence of the coating to the base sheet, it is preferred that the solvent include a lower aliphatic ester or a lower aliphatic ketone, especially a lower alkyl ester or ketone. Specific preferred solvents include ethyl acetate and methyl ethyl ketone. Other useful solvents include methyl isobutyl ketone, methyl isoamyl ketone, methyl n-amyl ketone, n-butyl acetate, methyl acetate, 2-ethyl-n-butyl acetate, ethyl lactate, and butyl lactate. Evidently, the nitrocellulose penetrates the polyester sheet well in such solution, and a similar effect is obtained with the use of a plasticizer. Consequently, excellent bonding is achieved when both conditions are employed.

A lower aliphatic alcohol may be employed, in addition, for its nitrocellulose solvent properties, and to enhance solvent evaporation. This is especially the case with SS nitrocellulose, where it is preferred that the alcohol constitute a major proportion of the solvent, whereas it is preferred that the ester or ketone constitute a major proportion of the solvent when employing RS nitrocellulose. Specific preferred alcohols include ethanol, isopropanol, and n-propanol. The alcohol further serves to dissolve the dye or dyes, where used. Preferably, the ester or ketone is employed in a weight ratio to the alcohol in the range of about 5:1 to 1:5, with the higher ratios applying to RS nitrocellulose and the lower ratios applying to SS nitrocellulose. Other solvents may be present as well.

The coating composition is compounded in a preferred manner by dissolving the dye(s), when employed, in the alcohol. The ester or ketone is added, and the particulate material, the plasticizer, the antioxidant(s), and the antistatic agent are added and mixed, to dissolve all but the particulate material. The nitrocellulose, in an appropriate solvent, is added and dissolved in the complete solution. The proportion of non-volatiles in the coating composition preferably is in the range of about 3 to 4.5%, by weight of the complete composition.

While polyester resin film sheet may be coated on but one side if desired, it is preferred to employ a sheet material which has been treated on both sides to render the opposite surfaces better adherable to the coating, and coat both sides of the sheet. An uncoated web of the sheet material preferably is coated by roller coating, one side at at time, and dried in an oven after each application with circulating air at a temperature of about 107° C. (225° F.), employing the preferred solvents. The coating on each web surface is dry and scratch-resistant after it emerges from the oven.

The thickness of the dried coating on each side of the polyester film sheet preferably is in the range of about 0.1 to 0.3 mils.

The following examples illustrate various coating compositions in accordance with the invention. It is to be understood that the invention is not limited to the materials, proportions, and conditions set forth therein, which are only illustrative. All proportions are by weight unless otherwise indicated.

EXAMPLE 1

A preferred blue dye-containing coating composition contains the following non-volatiles:

| Material | % By Weight |
|---|---|
| Orasol blue 2GLN | 1.6 |
| Methyl violet | 0.3 |
| Colloidal silica, Syloid 161 | 0.8 |
| AA Castor oil | 26.9 |
| Antioxidant, BHT | 0.8 |
| Antioxidant, DLTDP | 0.9 |
| Antistatic agent, Zelec NK | 6.3 |
| RS Nitrocellulose (5–6 sec.) | 62.4 |
| | 100.0 |

Syloid 161 (Grace) is a finely divided synthetic amorphous silica having an average particle size of 7 microns. The silica is employed in 30% by weight concentration in ethanol.

The nitrocellulose is supplied at a concentration of 16% in a solvent mixture of 36% ethyl acetate, 14% isopropanol, and 50% toluene, in proportions by weight.

The foregoing materials are admixed with ethanol and ethyl acetate in the manner described hereinabove, in a weight ratio of 1:4, ethanol to ethyl acetate. The resulting coating composition contains 3.8% non-volatiles.

It is preferred to employ as the base sheet adherable Mylar polyethylene terephthalate, in a thickness range of about 3.8–4.2 mils. The composition is coated on each side in a preferred thickness range of about 0.1–0.3 mil, so that the overall thickness of the resulting transparency is about 4.0–4.8 mils.

When the composition is coated on 4-mil adherable Mylar, at a dry coating thickness of about 0.2 mil on each side, in the hereinabove-described manner, a transparency of excellent properties is produced. The coating can not be scratched off even with considerable force. The transparency is readily imaged, on either side, in commercial xerographic or plain paper copiers. The imaged transparency has a clear, sharp permanent image which is well-suited for projection onto a viewing surface.

EXAMPLE 2

A preferred composition providing a colorless coating on a polyester resin film sheet contains the following non-volatiles:

| Material | % By Weight |
|---|---|
| Colloidal silica, Syloid 161 | 0.8 |
| AA Castor oil | 27.7 |
| Antioxidant, BHT | 0.8 |
| Antioxidant, DLTDP | 0.9 |
| Antistatic agent, Zelek NK | 6.6 |
| RS Nitrocellulose (5-6 sec.) | 63.1 |
| | 99.9 |

The materials are mixed with ethanol and ethyl acetate in the same manner and in the same proportions as Example 1, except that no dyes are dissolved in the solvent. The composition is employed in the same manner and with like results as the composition of Example 1.

EXAMPLE 3

The following non-volatile materials are mixed with a solvent mixture of ethanol and ethyl acetate in the same manner and in the same proportions as in Example 2, for use in the same manner, as a polyester resin film sheet coating composition:

| Material | % By Weight |
|---|---|
| Aluminum silicate | 1.2 |
| Dibutyl phthalate | 21.2 |
| Antioxidant, BHT | 0.5 |
| Antioxidant, DLTDP | 0.5 |
| Antistatic agent, Zelek NK | 6.0 |
| RS Nitrocellulose (5-6 sec.) | 70.6 |

EXAMPLE 4

The following non-volatile materials are mixed with a solvent mixture of ethanol and ethyl acetate in the same manner and in the same proportions as in Example 2, for use in the same manner, as a polyester resin film sheet coating composition:

| Material | % By Weight |
|---|---|
| Aluminum silicate | 0.8 |
| Alkylaryl phosphate Santicizer 141 | 27.7 |
| Antioxidant, BHT | 0.8 |
| Antioxidant, DLTDP | 0.9 |
| Antistatic agent, Kemamine AS-989 | 6.6 |
| RS Nitrocellulose (5-6 sec.) | 63.2 |
| | 100.0 |

EXAMPLE 5

The following non-volatile materials are mixed with a solvent mixture of ethanol and ethyl acetate in a 4:1 ratio of ethanol to ethyl acetate, for use in coating polyester resin film sheet material, as with the compositions of the preceding examples:

| Material | % By Weight |
|---|---|
| Titanium dioxide | 0.4 |
| Tricresyl phosphate | 29.0 |
| Antioxidant, BHT | 0.5 |
| Antioxidant, DLTDP | 0.5 |
| Antistatic agent, Zelek NK | 7.0 |
| SS Nitrocellulose (5-6 sec.) | 62.6 |
| | 100.0 |

The SS Nitrocellulose is added in the form of a 16% solution in ethanol.

We claim:

1. A transparency for receiving adherently thereon a toner-developed latent electrostatic image, which consisting essentially of:

a transparent polyester resin film sheet; and an image-receiving transparent coating on at least one surface of said sheet and comprising:

(a) nitrocellulose as the sole film forming material, (b) a plasticizer, and (c) a particulate material slip agent dispersed in the coating.

2. A transparency as defined in claim 1 wherein said particulate material is present in a proportion of about 0.4 to 1.5 percent by weight of the coating.

3. A transparency as defined in claim 1 and including an antistatic agent in said coating.

4. A transparency as defined in claim 1 wherein said polyester is polyethylene terephthalate.

5. A transparency as defined in claim 4 wherein said plasticizer is castor oil and said particulate material is silica.

6. A transparency as defined in claim 5 wherein said silica is present in a proportion of about 0.5 to 1.5 percent by weight of the coating.

7. A transparency for receiving adherently thereon a toner-developed latent electrostatic image, which comprises:

a polyethylene terephthalate resin film sheet; and an image-receiving coating on at least one surface of said sheet and comprising:

(a) nitrocellulose, (b) castor oil plasticizer, (c) a fatty alcohol phosphate antistatic agent, and (d) particulate silica dispersed in the coating in a proportion of about 0.5 to 1.5 percent by weight of the coating.

8. An imaged transparency which comprises a transparency for receiving adherently thereon a toner-developed latent electrostatic image, which comprises: a polyester resin film sheet; and an image-receiving coating on at least one surface of said sheet and comprising: (a) nitrocellulose, (b) a plasticizer, and (c) a particulate material dispersed in the coating; and a fused toner-developed latent electrostatic image on said coating.

9. An imaged transparency which comprises the transparency of claim 7, and a fused toner-developed latent electrostatic image on said coating.

* * * * *